Dec. 29, 1942.   D. F. EBBERT   2,306,938
TESTING AND DISPLAY DEVICE
Filed Aug. 2, 1941   3 Sheets-Sheet 1
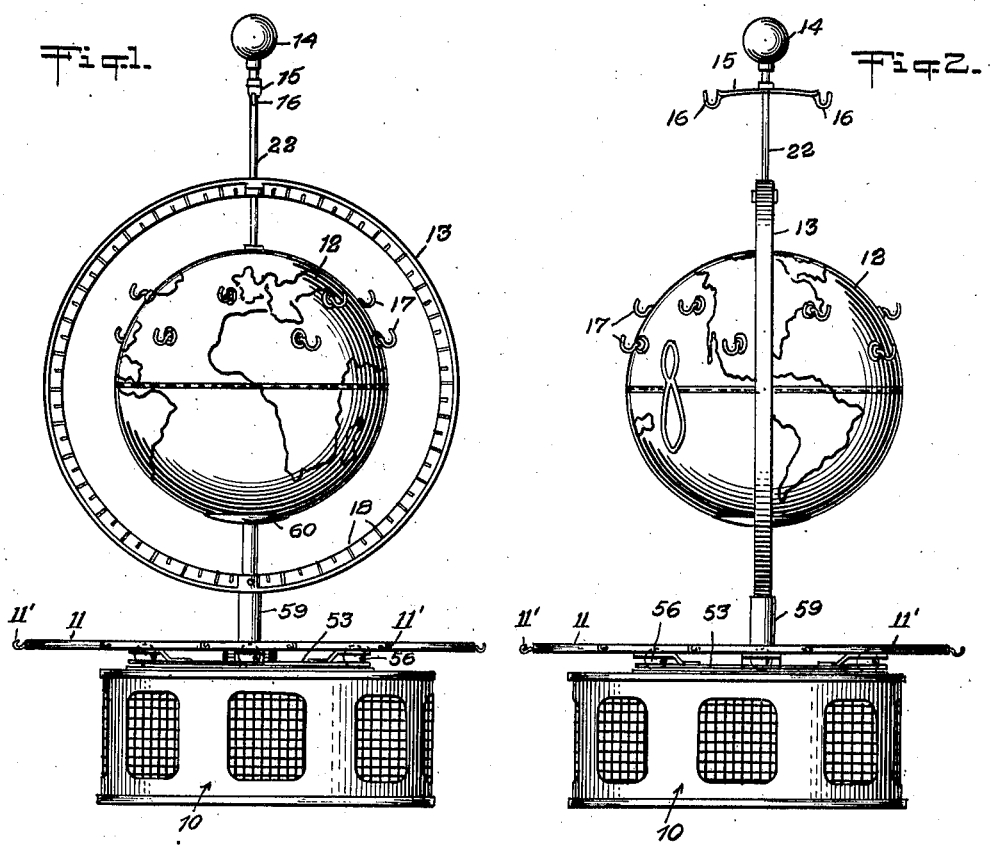
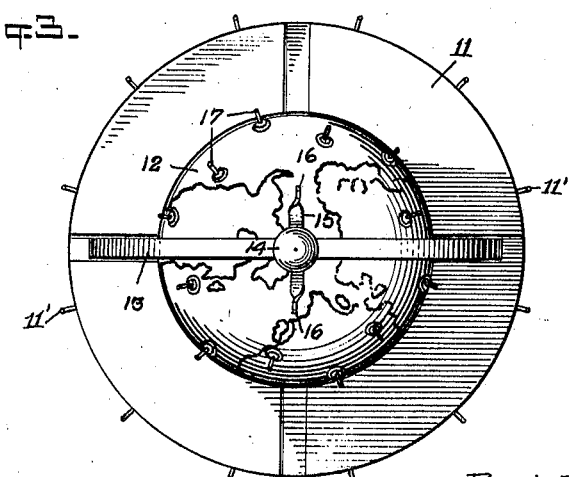
INVENTOR
*Daniel Forbes Ebbert*
BY
ATTORNEYS Dec. 29, 1942.    D. F. EBBERT    2,306,938
TESTING AND DISPLAY DEVICE
Filed Aug. 2, 1941    3 Sheets-Sheet 2
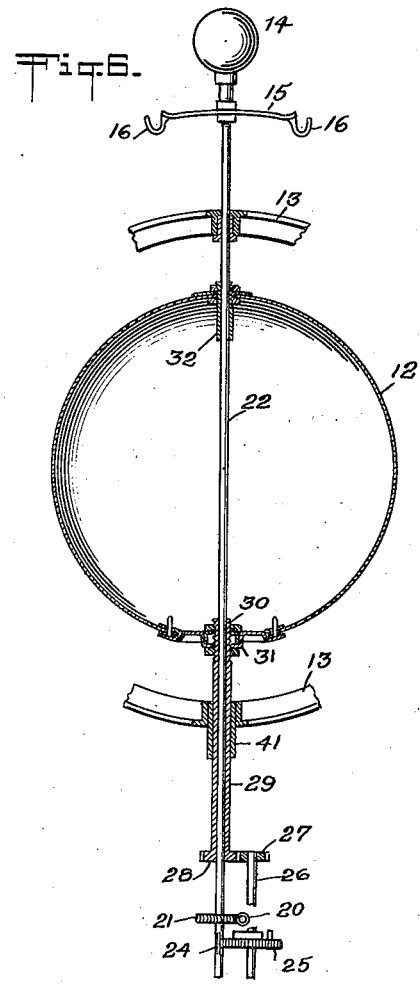
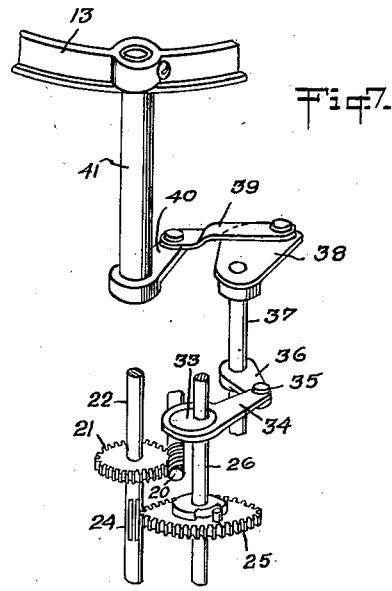
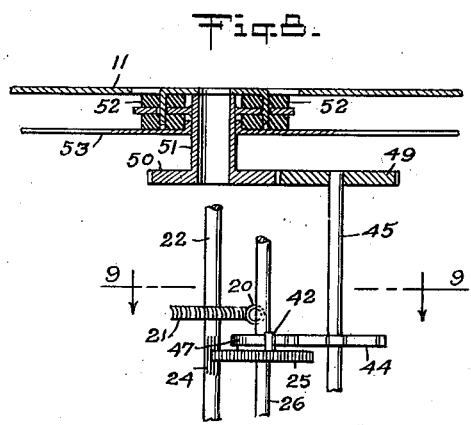
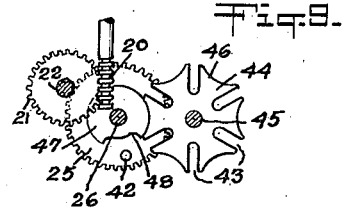
INVENTOR
*Daniel Forbes Ebbert*
BY
*Munn, Liddy, Glaccum & Kane*
ATTORNEYS Dec. 29, 1942.   D. F. EBBERT   2,306,938
TESTING AND DISPLAY DEVICE
Filed Aug. 2, 1941   3 Sheets-Sheet 3
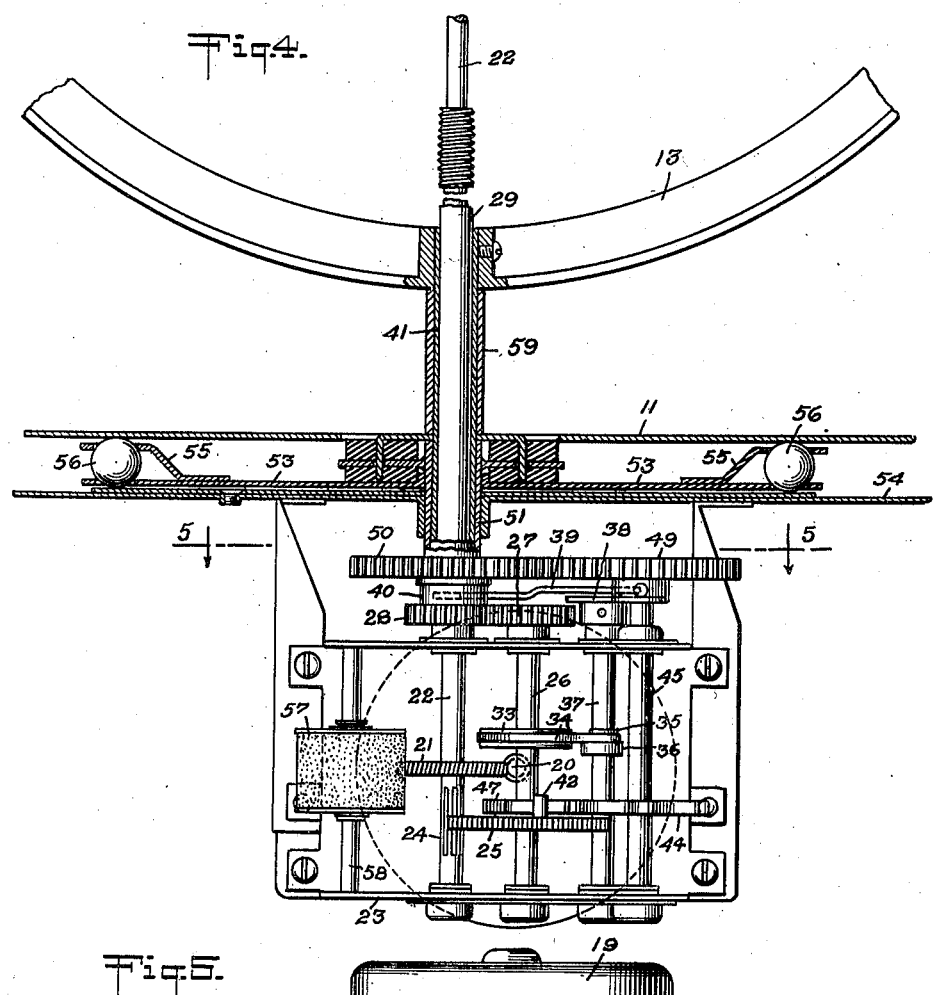
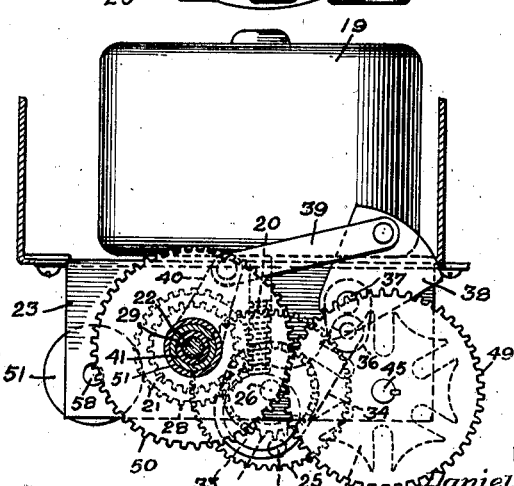
INVENTOR
Daniel Forbes Ebbert
BY
Munn, Liddy, Glaccum & Kane
ATTORNEYS Patented Dec. 29, 1942

2,306,938

UNITED STATES PATENT OFFICE 2,306,938

TESTING AND DISPLAY DEVICE

Daniel Forbes Ebbert, Wheeling, W. Va.

Application August 2, 1941, Serial No. 405,168

3 Claims. (Cl. 211—1.6)

This invention relates to an improved testing and display device to be used both in testing and displaying watches and other articles of merchandise.

It is an object of this invention to provide a device of the above character which is so constructed for window display purposes as to attract attention and which is relatively inexpensive to manufacture and will operate for a relatively long period of time with comparative freedom from wear.

A further object is the provision of an improved device to be used in testing watches, in which the watch will be subjected to the various motions to which it is subjected during normal use, or the natural movement of the human body.

After a watch has been repaired and adjusted it is customary for the jeweler or repair man to place the watch on a rack for a given period of time to make sure that the watch has been properly adjusted and keeps the correct time. The difficulty of testing a watch in this manner is that the rack is generally stationary and, accordingly, the watch is not subjected to the usual movements, jolts and jars which it encounters during normal use.

My present invention contemplates overcoming these difficulties by providing a device which may be used in testing watches, wherein the watch may be subjected to various motions and jolts simulating as near as possible those encountered during normal use. In carrying out my invention I utilize an improved unitary construction of such a character as to attract attention so that the device may be used for display purposes as well as for testing purposes.

In the accompanying drawings—

Fig. 1 is a front elevation of a testing and display device embodying my invention;

Fig. 2 is a side elevation of the device;

Fig. 3 is a top plan view of the device;

Fig. 4 is an elevational view partly sectional, showing the driving mechanism and gearing together with the connected shafts for operating my device;

Fig. 5 is a top plan view of the operating mechanism and gearing on the line 5—5 of Fig. 4;

Fig. 6 is a longitudinal sectional view of the globe and portions of the ring surrounding the globe, together with the connecting parts for causing their rotation;

Fig. 7 is a detail view of the driving mechanism and gearing for the ring;

Fig. 8 is a detail view in elevation of the driving mechanism and gearing for the platform, and Fig. 9 is a sectional plan view of a portion of the driving mechanism and gearing for the platform, taken on the line 9—9 of Fig. 8.

My improved testing and display device preferably comprises a base 10 having a rotatable platform or turntable 11 mounted thereon. Suitably supported above the platform and base so that they may rotate or reciprocate in the manner hereinafter described are a sphere 12 preferably in the form of a globe having an outline map of the world thereon, a ring 13 surrounding the globe and preferably disposed in a vertical plane, and a small ball 14 positioned over the center of the globe and having the cross arm 15 mounted immediately beneath it and provided with hooks 16 at its opposite ends. A suitable driving mechanism and gearing are provided in the base to impart various types of motion to the several elements described above. Thus an intermittent rotary motion is preferably imparted to the platform 11. A reciprocating motion is preferably imparted to the ring 13, relatively rapid rotary motion is preferably imparted to the ball 14 and cross arm 15, and slower rotary motion is preferably imparted to the sphere 12.

Watches and other items to be displayed or tested may be placed upon the platform 11 or hung from the hooks 11', may be suspended from the hooks 16 on the cross arm 15, or may be suspended from the hooks 17 attached to the surface of the globe. When watches are being tested as to accuracy in time, they may be successively suspended from or placed upon the several parts so as to be subjected to various types of motion. The ring 13 may serve as a degree marker and may be provided with small markings 18 representing the number of degrees. It will be appreciated that suitable means may be provided on the ring 13 for suspending watches, if desired.

The mechanism whereby the various types of motion described above are imported to the several parts of my device is shown most clearly in Figs. 4 to 9. It will be seen that I provide a suitable prime mover, such as the electric motor 19 inside the base 10, and by means of gearing, also encased in the base, I impart the desired type of motion to the parts. Thus it will be seen that the motor is provided with a shaft having a worm 20 formed on the end thereof which meshes with a worm gear 21 fixedly attached to the central spindle or shaft 22 which extends upwardly through the casing, through the two sides of ring 13 and through the globe 12, and has the ball 14 and cross arm 15 fixedly attached to the upper end thereof. The spindle 22 is suitably journaled in and supported from the frame 23 in the casing. When motor 19 is caused to rotate in a clockwise direction as viewed from the front thereof, spindle 22 will likewise be driven in a clockwise direction when viewed from the top thereof. The worm 20 and worm gear 21 constitute a speed-reducing connection, but since a motor of fairly high speed is employed, the spindle, ball 14 and cross arm 15 will, nevertheless, rotate at a relatively high speed.

The globe or sphere 12 is preferably caused to rotate in the same direction as the ball 14 but at a relatively lower rate of speed, and for this purpose I provide speed-reduction gearing between the spindle and the sphere. Thus it will be seen I provide the spindle 22 with gear teeth 24 forming an integral relatively small pinion which meshes with a relatively larger pinion 25 keyed to shaft 26 which also is journaled in the frame 23. Fixedly attached adjacent the upper end of the shaft 26 is a pinion 27 meshing with a pinion 28 formed on the end of a hollow shaft 29. The hollow shaft 29 surrounds spindle 22 and is suitably connected at its upper end to the bottom of the sphere or globe 12, as for instance by being provided with threads 30, which are threaded to a bracket 31 attached to the lower portion of the sphere (Figs. 4 and 6). The upper portion of the sphere is preferably provided with a sleeve 32, which serves as a bearing for the spindle 22. When spindle 22 rotates in a clockwise direction it will be seen that due to the connection just described, sphere or globe 12 will be caused to rotate in the same direction at a relatively slower rate of speed.

The mechanism for imparting a reciprocatory motion to ring 13 is most clearly shown in Figs. 4 and 7, and comprises a circular disk 33 eccentrically mounted on the shaft 26 and disposed in and rotatable with respect to a circular aperture formed in link 34 which, in turn, is pivotally connected at 35 to a crank 36 keyed to shaft 37. When shaft 26 rotates the eccentrically mounted disk 33 will impart a reciprocatory movement to link 34, arm 36 and shaft 37. Shaft 37 is also mounted in the frame 23 and at the upper end thereof is attached an arm 38 projecting outwardly from one side and having pivotal connection with link 39 which, in turn, is pivotally connected to crank 40 attached to the lower end of hollow shaft 41 which surrounds the spindle 22 and hollow shaft 29 and has attached to its upper end the lower portion of ring 13, as most clearly shown in Figs. 6 and 7. As previously described, when shaft 26 rotates it imparts a reciprocatory movement to the shaft 37 which is transmitted through arm 38, link 39 and arm 40 to the hollow shaft 41 and ring 13.

Intermittent rotary motion is imparted to platform 11 by some suitable driving connection, such as the Geneva movement shown most clearly in Figs. 8 and 9. Thus it will be seen that pinion 25 is provided with a lug or pin 42 projecting upwardly adjacent the periphery thereof and adapted to engage with the slots 43 in the Geneva wheel or cross 44 which is attached to shaft 45. The Geneva cross is provided with teeth 46 between the slots 43 having concave arcuate outer surfaces which engage with the periphery of disk 47 attached to shaft 26 immediately above the pinion 25 and serving to restrain the Geneva wheel against rotation until the pin 42 engages with one of the slots 43. Adjacent the pin 42 the periphery of disk 47 is cut away, as shown at 48, so as to provide clearance for the rotation of the Geneva wheel. Due to this construction it will be seen that when pinion 25 rotates, once during each revolution the pin 42 will engage with one of the slots 43 in the Geneva wheel and cause it to rotate through an arc of approximately 60°. In this manner an intermittent rotary motion is imparted to the Geneva wheel and shaft 45.

Shaft 45 is suitably supported for rotary motion in the frame 23 and at its upper end is provided with a pinion 49 meshing with a pinion 50 formed on the lower end of hollow shaft 51 which surrounds spindle 22, hollow shaft 29, and hollow shaft 41 and is attached at its upper end to the rubber cushions 52 by means of projecting lugs. Platform 11 is, in turn, attached to the cushions 52 by depending lugs. It will, accordingly, be seen that when intermittent rotary motion is imparted to shaft 45 it is transmitted, through pinions 49 and 50, to hollow shaft 51, rubber cushions 52 and platform 11. Due to the gearing connection just described, the platform will rotate in an opposite direction to the sphere 12 and ball 14.

Platform 11 is suitably mounted on top of base 10, so that it will not tilt and so as to provide adequate support for the articles contained therein, but, at the same time, so that it may freely rotate. For this purpose I preferably provide the cross arms 53 above the top 54 of the base and these cross arms are provided with sockets 55 at the end thereof for accommodating ball bearings 56 which protrude through apertures at the top and bottom of the sockets, engaging with the top 54 of the base and with the lower surface of the platform 11. Two of the arms serve to support the rubber cushions 52, as shown.

So as to insure adequate lubrication for the worm gearing, I preferably provide a drum 57 made of absorbent material and which is mounted upon a shaft 58 so that it may rotate. Drum 57 engages the worm gear 21 and is saturated with a suitable lubricant which is imparted to the worm gear. Between the ring 13 and platform 11 I may provide a spacing collar 59, as shown in Fig. 4, to give additional support to the ring. Also at the lower portion of the sphere I may provide a dish-like disk 60 which will serve to cover and conceal the bracket 31 and the threaded connection between the bracket and hollow shaft 29.

From the foregoing description of my device it will be seen that when the motor 19 is operated, spindle 22, ball 14 and cross arm 15 are caused to rotate relatively rapidly in one direction and sphere 12 is caused to rotate in the same direction at a relatively lower rate of speed. Also ring 13 is caused to reciprocate and an intermittent rotary motion in a direction opposite to the sphere 12 is imparted to platform 11.

My device may be used either for display purposes or for testing watches and, as previously stated, when used for testing watches the watches are subjected to motions closely simulating the motions which are encountered during normal use.

It should be remembered, of course, that modifications may be made in the illustrated and described embodiment of my invention without departing from the invention as set forth in the accompanying claims.

I claim:

1. A testing and display device comprising a base member, driving mechanism including a motor in the base member, a vertical spindle having article supporting means near the upper end thereof supported from the base member and connected to the driving mechanism so as to rotate in one direction, a body having article supporting means connected thereto supported from the base member and surrounding the spindle so as to be rotatable with respect thereto and connected to the driving mechanism by means of a first hollow shaft surrounding the spindle so that the body is rotated in one direction, a ring supported from the base member and surrounding the body and having means embracing the spindle which is rotatable with respect thereto, said ring being connected to the driving mechanism by means of a second hollow shaft surrounding the spindle and the first-mentioned shaft so that the ring reciprocates, and a platform supported from the base member and surrounding the spindle and the first and second shafts and connected to the driving mechanism by means of a hollow shaft which also surrounds the spindle and the first and second hollow shafts so as to impart intermittent rotary motion to the platform.

2. A testing and display device comprising a base member, driving mechanism including a motor in the base member, a vertical spindle having article supporting means near the upper end thereof supported on the base member and connected to the driving mechanism so as to rotate in one direction at a relatively high rate of speed, a body having article supporting means thereon supported above the base member and surrounding the spindle so as to be rotatable with respect thereto, said body being connected to the driving mechanism by means of gearing, and a hollow shaft surrounding the spindle so as to rotate in the same direction as the spindle at a relatively lower rate of speed, a ring disposed in a vertical plane surrounding the body and having apertures which accommodate the spindle and first hollow shaft so that the ring may rotate with respect thereto, the ring being connected to the driving mechanism by means including an eccentric, a crank arm, a second hollow shaft surrounding the spindle and the first hollow shaft whereby the ring is caused to reciprocate, a platform mounted on the base member and surrounding the spindle and the first and second hollow shafts so as to be rotatable with respect thereto, and means for connecting the platform to the driving mechanism comprising a Geneva movement and a third hollow shaft surrounding the spindle and the first and second hollow shafts whereby intermittent motion is imparted to the platform.

3. A testing and display device as set forth in claim 2, in which cross arms having sockets holding ball bearings are interposed between the platform and base member, the ball bearings being exposed through the top and bottom of the sockets so as to engage the top of the base member and the lower surface of the platform.

DANIEL FORBES EBBERT.